(12) United States Patent
Satoh et al.

(10) Patent No.: US 9,264,745 B2
(45) Date of Patent: Feb. 16, 2016

(54) VIDEO SERVER APPARATUS, VIDEO EDITING SYSTEM, AND CONTROL METHOD OF VIDEO SERVER APPARATUS

(75) Inventors: Naoko Satoh, Hachioji (JP); Shuichi Yamaguchi, Kawasaki (JP); Toshiki Mori, Kodaira (JP); Hiroyuki Watanabe, Koganei (JP); Hiroyuki Wada, Fuchu (JP); Keita Kobayashi, Tama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/363,105

(22) Filed: Jan. 31, 2012

(65) Prior Publication Data

US 2012/0237185 A1  Sep. 20, 2012

(30) Foreign Application Priority Data

Mar. 17, 2011  (JP) ................. 2011-059927

(51) Int. Cl.
| | |
|---|---|
| *H04N 5/93* | (2006.01) |
| *H04N 21/234* | (2011.01) |
| *H04N 21/236* | (2011.01) |
| *H04N 21/81* | (2011.01) |
| *H04N 21/8352* | (2011.01) |

(52) U.S. Cl.
CPC ... *H04N 21/23424* (2013.01); *H04N 21/23608* (2013.01); *H04N 21/814* (2013.01); *H04N 21/8352* (2013.01)

(58) Field of Classification Search
CPC ....................................... H04N 5/93
USPC ......................... 386/278, E5.003
See application file for complete search history.

(56) References Cited

U.S. PATENT DOCUMENTS

| | | | | |
|---|---|---|---|---|
| 2002/0053085 | A1* | 5/2002 | Toguri | 725/51 |
| 2002/0057894 | A1* | 5/2002 | Ishige | 386/46 |
| 2003/0031319 | A1* | 2/2003 | Abe et al. | 380/232 |
| 2006/0070106 | A1* | 3/2006 | Kitazato | 725/88 |
| 2007/0106681 | A1* | 5/2007 | Haot et al. | 707/100 |
| 2007/0189718 | A1* | 8/2007 | Kobayashi et al. | 386/95 |
| 2007/0255632 | A1* | 11/2007 | Hatano et al. | 705/28 |
| 2008/0187281 | A1* | 8/2008 | Abiko et al. | 386/52 |
| 2008/0260348 | A1* | 10/2008 | Maeda et al. | 386/64 |
| 2011/0064380 | A1* | 3/2011 | Kiyama | 386/239 |
| 2011/0222838 | A1* | 9/2011 | Dachiku | 386/353 |

FOREIGN PATENT DOCUMENTS

JP   2010-239400   10/2010

OTHER PUBLICATIONS

Background Art Information sheet in 1 page.

* cited by examiner

*Primary Examiner* — Thai Tran
*Assistant Examiner* — Nien-Ru Yang
(74) *Attorney, Agent, or Firm* — Knobbe, Martens, Olson & Bear, LLP (57) ABSTRACT

According to one embodiment, a video server apparatus includes a table generator, an acquisition module, and a controller. The table generator generates a management table associating a contents ID with the contents data, and stores the management table in the memory. The acquisition module acquires contents management information from a change request source upon generation of a change request for the contents data. The controller refers to the management table based on the contents ID included in the contents management information, executes change processing for the contents data recorded in the memory based on a reference result of the management table.

17 Claims, 8 Drawing Sheets

VIDEO SERVER APPARATUS, VIDEO EDITING SYSTEM, AND CONTROL METHOD OF VIDEO SERVER APPARATUS

CROSS-REFERENCE TO RELATED APPLICATIONS

This application is based upon and claims the benefit of priority from prior Japanese Patent Application No. 2011-059927, filed Mar. 17, 2011, the entire contents of which are incorporated herein by reference.

FIELD

Embodiments described herein relate generally to a video server apparatus which stores contents data such as news programs, a video editing system, and a control method of the video server apparatus.

BACKGROUND

A broadcast program play-out system stores contents data of broadcast programs in a video server in advance, and plays back and transmits the contents data toward transmitter or equipment in accordance with an instruction from an automation program control system (APC). In such on-air processing, conformation processes of the contents data are executed according to an on-air order before they are transmitted toward transmitter or equipment.

After the system transmits the contents data to the video server, contents files are often required to be partially replaced urgently. In general, broadcast contents data has a large size, and it takes much time to record the full data again. Hence, a need for transmitting only a difference to shorten a time until broadcasting has arisen. To this need, a solution to transmit difference contents data and to play them back as a playlist is available. However, the user is required to make troublesome processes since he or she has to save the difference contents data as independent files, and create a playlist. In addition, the contents data are to be saved in the form of a plurality of contents data and playlist. Also, since a change such as only a part of video or audio data cannot be coped with, even when only audio data is to be changed, video data of that part has to be replaced together.

When only ancillary data (ANC data) is to be replaced, a method of installing a dedicated replacement apparatus to cope with a change of only video, audio, or auxiliary data (for example, by installing a subtitle replacement server) is available. However, this results in high cost as the whole system.

DETAILED DESCRIPTION

Hereinafter, referring the accompanying drawings, an embodiment will be explained in detail.

In general, according to one embodiment, a video server apparatus includes a table generator, an acquisition module, and a controller. The table generator generates a management table associating a contents ID with the contents data, and to store the management table in the memory upon recording of the contents data, wherein the contents ID corresponds with the contents data. The acquisition module acquires contents management information from a change request source upon generation of a change request for the contents data, wherein the contents management information includes information indicating a contents ID to be changed, a change start position, and a change end position. The controller refers to the management table based on the contents ID included in the contents management information, executes change processing for the contents data recorded in the memory based on a reference result of the management table, and updates the contents data corresponding to the contents ID in the management table after the change processing.

Figure 1:
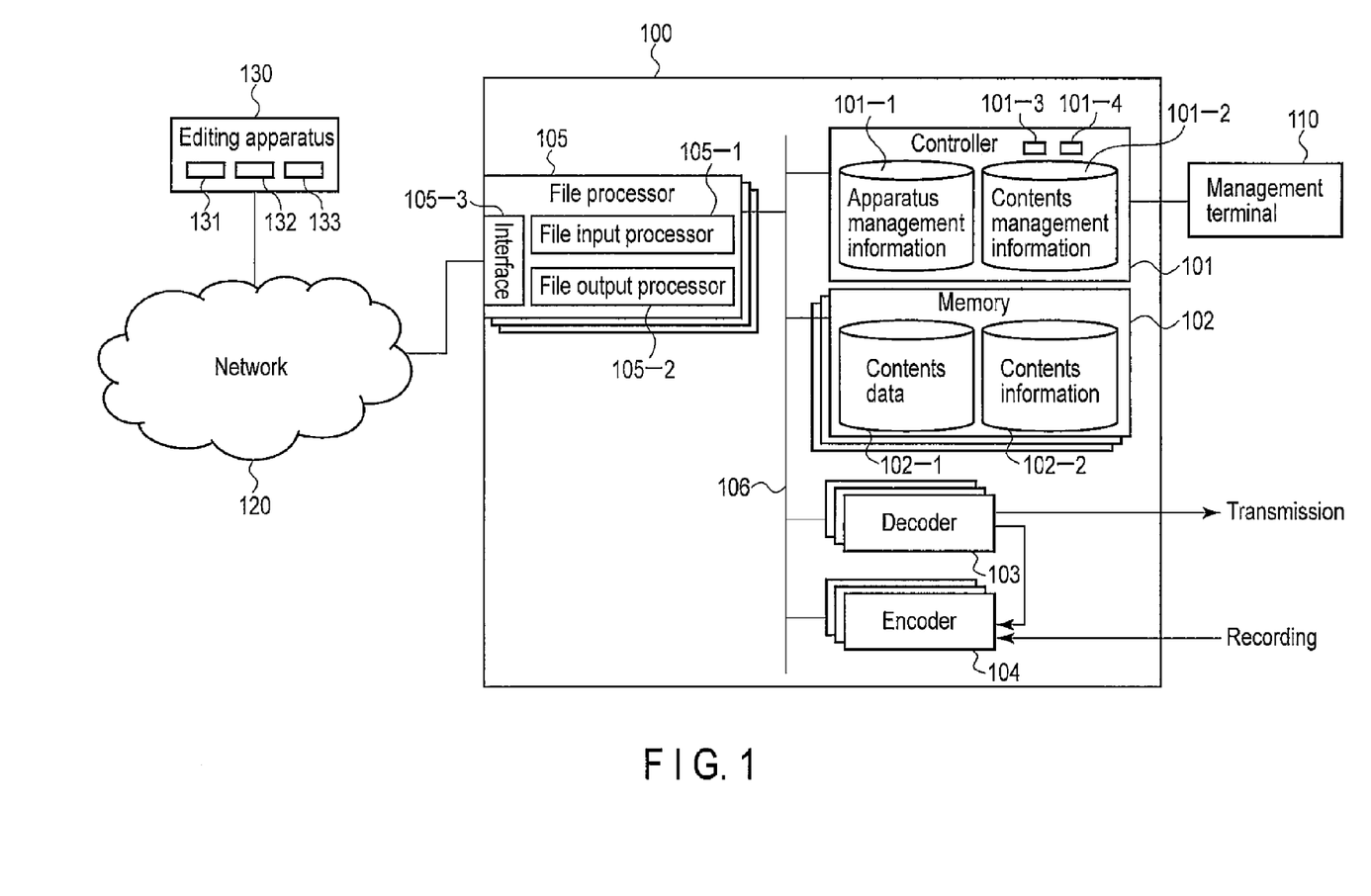
FIG. 1 is a block diagram showing the arrangement of a broadcast program play-out system as a video editing system according to an embodiment.

FIG. 1 is a block diagram showing the arrangement of a broadcast program play-out system as a video editing system according to an embodiment.

Referring to FIG. 1, reference numeral 100 denotes a play-out server as a video server apparatus, which includes a controller 101, a memory 102 including a plurality of memory sets, a decoder 103, encoder 104, and a file processor 105. These controller 101, memory 102, decoder 103, encoder 104, and file processor 105 are connected to each other via a bus 106.

Video signals of broadcast programs to be transmitted toward transmitter or equipment are encoded by the encoder 104 in an encoding format such as MPEG2 (Moving Picture Experts Group 2), and are recorded in the memory 102 as contents data. The contents data recorded in the memory 102 are selectively played back according to an on-air instruction signal supplied from an APC (not shown). The playback data are decoded by the decoder 103 to obtain video signals, which are selectively output toward transmitter or equipment.

On the other hand, the controller 101 executes recording/playback control of contents data for the memory 102, decoder 103, and encoder 104 in accordance with an operation input instruction of a management terminal 110.

The file processor 105 is connected to a network 120 as needed. The file processor 105 includes a file input processor 105-1, file output processor 105-2, and interface (IF) 105-3. The IF 105-3 executes interface processing with the connected network 120. Furthermore, the file processor 105 executes exchange processing of various kinds of control information associated with the interface processing with the controller 101 via the file input processor 105-1, file output processor 105-2, and bus 106.

The play-out server 100 is connected to an editing apparatus 130 via the network 120. The editing apparatus 130 has a function of creating and editing contents data. The created or edited contents data are stored in a database 131. In this embodiment, the editing apparatus 130 includes a request transmitter 132 and contents transmission controller 133. The request transmitter 132 transmits a change request to the play-out server 100 via the network 120 after contents data which are required to be replaced are stored in the database 131.

Upon reception of an acquisition request from the play-out server 100, the contents transmission controller 133 transmits contents data, which have already been edited, to the play-out server 100 in turn.

In this embodiment, the controller 101 includes apparatus management information 101-1, and manages how many units of the encoder, decoder, and the like the play-out server 100 includes. Furthermore, the controller 101 has contents management information 101-2, and manages in which memories in the play-out server 100 data are allocated. The memory 102 includes a contents data memory 102-1 and contents information memory 102-2. In case of a large system, a plurality of such memories are included for the purpose of load distribution and speeding-up.

The contents data memory 102-1 and contents information memory 102-2 are managed for respective contents IDs while being classified as, for example, folders. As one management example, in case of normal contents copying processing, even when no change is required, a playlist is created as a management table, and is managed for each contents type.

Figure 2:
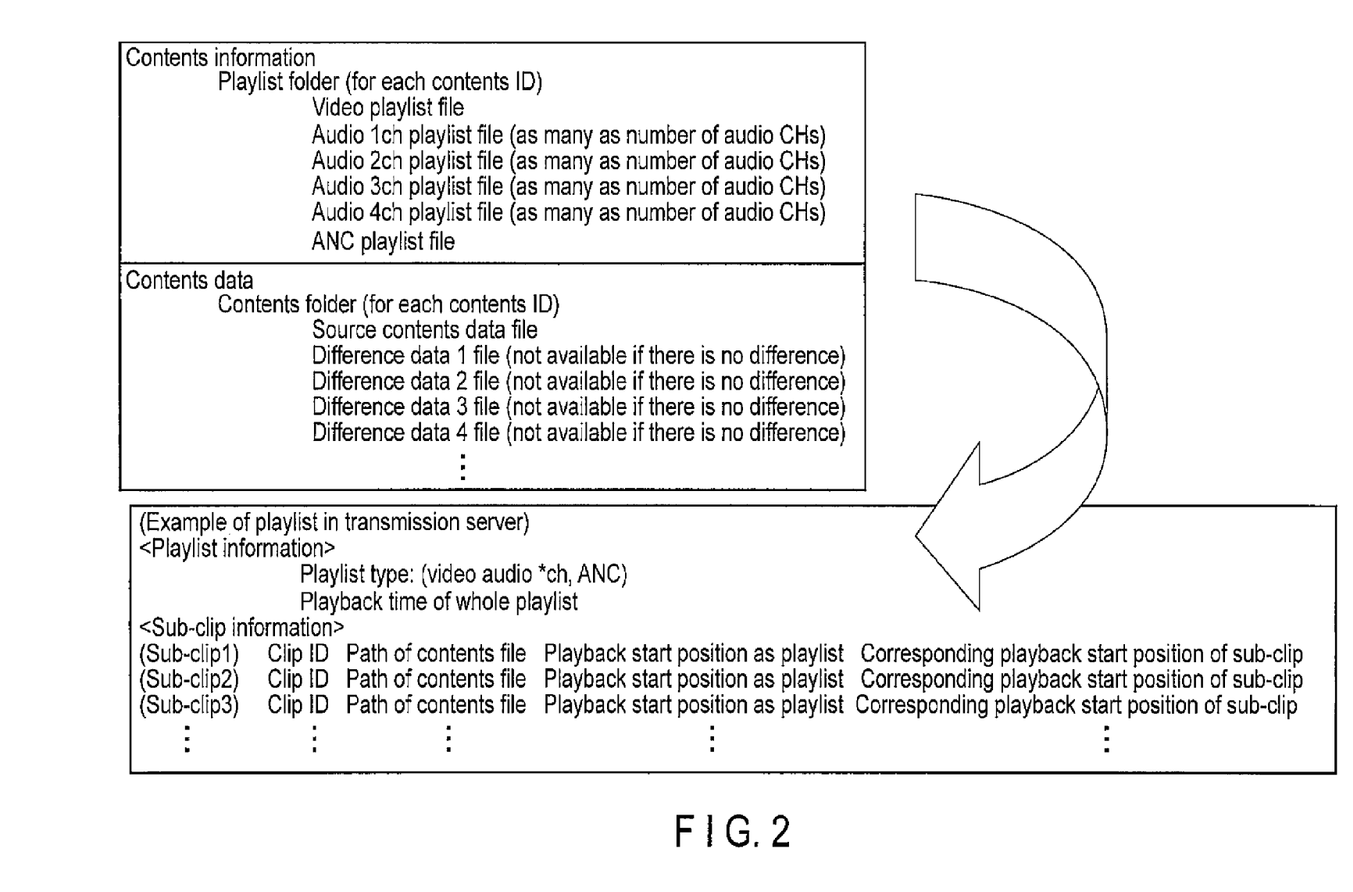
FIG. 2 is a view showing a playlist included in a play-out server according to the embodiment.

FIG. 2 shows an example of a playlist included in the play-out server 100. The contents information memory 102-2 is created for each contents type included in an internal playlist set (including video, audio, and ANC data as one set). This is a management example, and another method may be used.

Furthermore, the controller 101 includes an acquisition unit 101-3 and contents change controller 101-4 as functions according to this embodiment. Upon reception of a change request for contents data from the editing apparatus 130, the acquisition unit 101-3 acquires metadata (contents management information) including information indicating a contents ID to be changed and change start and end positions from the editing apparatus 130.

The contents change controller 101-4 refers to a playlist in the memory 102 based on the contents ID included in the metadata acquired by the acquisition unit 101-3, executes change processing for contents data recorded in the contents data memory 102-1 based on this reference result, and updates contents data corresponding to the contents ID in the playlist after the change processing. In this case, difference data files acquired from the editing apparatus 130 are recorded and managed in the contents data memory 102-1 in association with the contents ID.

The contents change controller 101-4 reads out contents data to be changed from the memory 102, controls the decoder 103 to decode the readout contents data, controls the encoder 104 to re-encode the decoded contents data, and then records the re-encoded contents data in the memory 102. In this case, the controller 101-4 records the contents data in an empty memory set.

Figure 3:
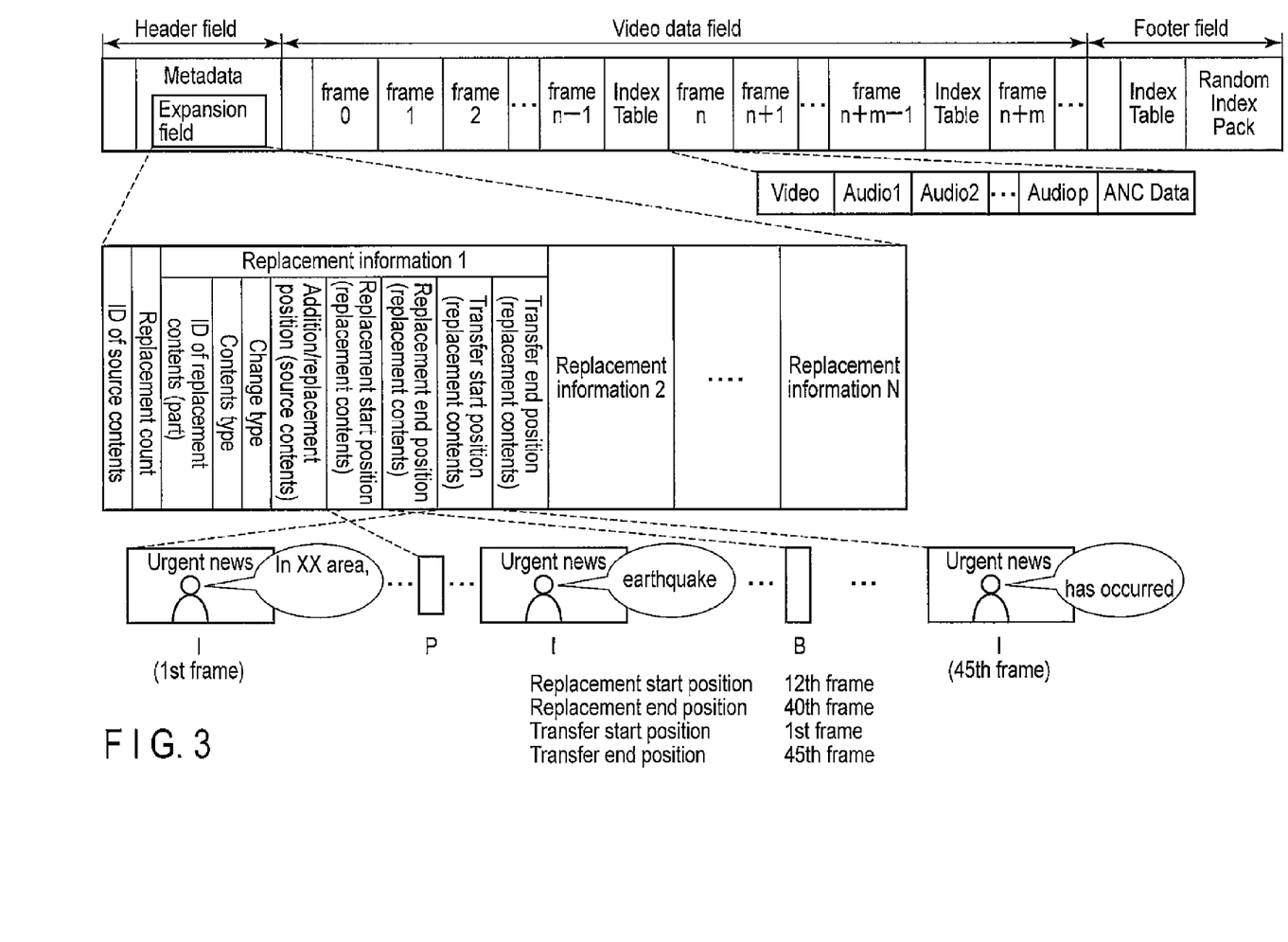
FIG. 3 is a view showing the structure of a contents file sent from an editing apparatus according to the embodiment.

FIG. 3 is a view showing the structure of a contents file transmitted from the editing apparatus 130. The contents data file shown in FIG. 3 includes a header field, body field, and footer field. The contents data file has a different data size for each contents.

The header field stores attribute data such as a video format of the contents data file. A metadata expansion field in the header field stores information required for replacement. The information in the expansion field includes an ID which uniquely indicates a source contents, a replacement number, and pieces of individual replacement information. Individual replacement information will be explained below taking replacement information 1 as an example.

"ID of replacement contents (part)" is an ID uniquely assigned to only a replacement part. This ID of the replacement contents is used in internal contents management unlike a contents ID of FIG. 3 as a whole. Also, the ID of the replacement contents (part) is assigned to commonize a format at the time of updating processing during editing processing (to be described later).

"Contents type" is used to designate which of video data, audio 1ch data to Nch data, and ANC data a replacement part is. A plurality of types can be simultaneously replaced by designating types using bits. As replacement of a plurality of types, all audio data are to be replaced together, all of video, audio, and ANC data are to be replaced, and so forth.

"Change type" designates addition, replacement, or deletion. In case of addition, data is added from "replacement start position (replacement contents)" to "replacement end position (replacement contents)". In case of replacement, data in a range from "replacement start position (replacement contents)" to "replacement end position (replacement contents)" is replaced from "addition/replacement position (source contents)". In case of deletion, data in a range from "replacement start position (replacement contents)" to "replacement end position (replacement contents)" is deleted from "addition/replacement position (source contents)".

"Transfer start position (replacement contents)" and "transfer end position (replacement contents)" designate a required part when data before and after replacement positions are required to generate video data at "replacement start position" in terms of a compression format.

The body field stores a contents data body, and stores video, audio, and ANC data while dividing them into 33-ms frame periods. For each GOP (Group of Picture), an index table is included to hold preceding frame information. The footer field indicates the end of the video data file.

For example, assume that in an urgent news program, "earthquake of level 2 has occurred in XX area is to be replaced by "earthquake of level 1 has occurred in XX area", a replacement start position corresponding to "level 1" is the 12th frame, and a replacement end position is the 40th frame. When the 12th frame corresponds to P-picture of a GOP, and the 40th frame corresponds to B-picture of the GOP, a transfer start position is the 1st frame corresponding to I-picture, and a transfer end position is the 45th frame corresponding to I-picture.

This GOP structure has three types of pictures, that is, intra "I" picture based on intra-frame encoding, predictive "P" picture based on inter-frame forward predictive encoding, and bi-directionally predictive "B" picture based on bidirectional predictive encoding. The arrangement sequence of these pictures is IBBPBBP, . . . , and one GOP period is normally set to be about 15 frames. When this GOP structure is collapsed, troubles such as disturbance of the screen or disruption of playback at the time of video playback occur. For this reason, the pattern of the GOP structure has to be prevented from being collapsed at the time of replacement.

The operation in the above arrangement will be described below.

Figure 4:
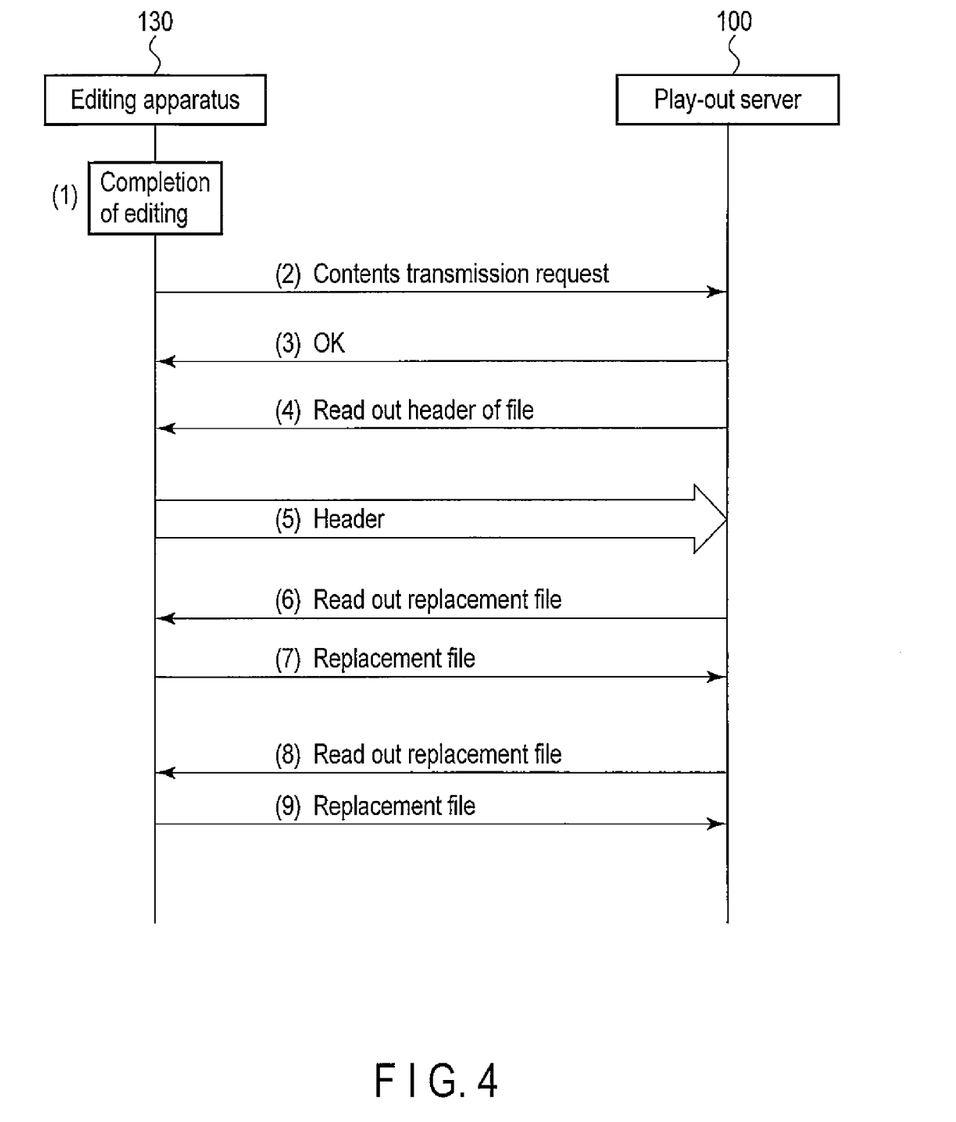
FIG. 4 is a sequence chart showing information transmission/reception operations between the play-out server and editing apparatus upon replacing contents data according to the embodiment.

FIG. 4 is a sequence chart showing information transmission/reception operations between the play-out server 100 and editing apparatus 130 upon replacement of contents data.

For example, upon completion of editing of replacement files, the editing apparatus 130 stores the replacement files in the database 131. Then, the editing apparatus 130 analyzes the replacement files stored in the database 131 to calculate a header field, and stores metadata including information indicating a source contents ID, replacement start position, and replacement end position in an expansion field of the header field in the database 131 (FIG. 4(1)).

Subsequently, the editing apparatus 130 transmits a contents transmission request including information indicating a contents ID to be replaced and a replacement message to the play-out server 100 via the network 120 (FIG. 4(2)).

Upon reception of the contents transmission request, the play-out server 100 replies an acceptance message (OK) to the editing apparatus 130 (FIG. 4(3)), and then transmits a file header acquisition request to the editing apparatus 130 (FIG. 4(4)).

Upon reception of the acquisition request, the editing apparatus 130 reads out the header field of the corresponding replacement file from the database 131, and transmits information of this header field to the play-out server 100 (FIG. 4(5)).

Upon reception of the information of the header field, the play-out server 100 compares and collates the contents ID included in the metadata in this header field with that in a playlist stored in the memory 102. When the two contents IDs match, the play-out server 100 transmits a read-out request of the replacement file to the editing apparatus 130 (FIG. 4(6)).

Upon reception of the read-out request from the play-out server 100, the editing apparatus 130 reads out the corresponding replacement file from the database 131, and transmits this replacement file to the play-out server 100 (FIG. 4(7)). Then, when there are N replacement files, the play-out server 100 transmits a read-out request of the replacement file in turn until the Nth file (FIG. 4(8)), and receives the Nth replacement file (FIG. 4(9)), thus ending the processing.

Figure 5:
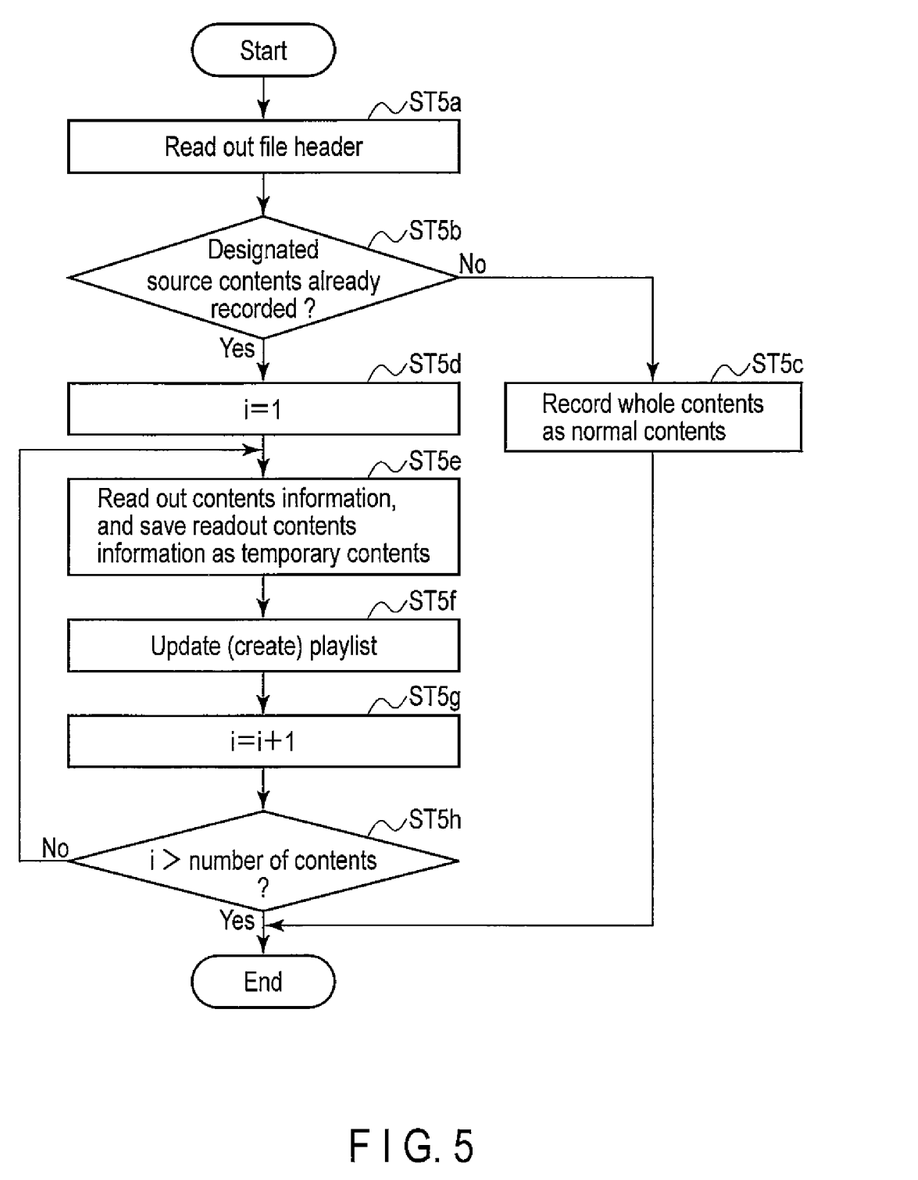
FIG. 5 is a flowchart showing the control processing sequence of a controller upon extracting a difference from a replacement file according to the embodiment.

FIG. 5 is a flowchart showing the control processing sequence of the controller 101 upon extracting a difference from a replacement file.

The controller 101 reads out a file header from the editing apparatus 130 (step ST5a). Then, the controller 101 analyzes an expansion field of the file header. If no replacement contents is designated or if no replacement source contents is recorded, the process shifts the state from step ST5b to step ST5c to record that contents as a new contents, thus ending the processing.

On the other hand, if the replacement source contents has already been recorded in the memory 102, the controller 101 executes replacement processing of parts designated in a replacement number. Initially, the controller 101 sets "1" in the replacement number (step ST5d), records a replacement file as a temporary contents in the memory 102 according to information of the replacement source data (step ST5e), and updates a playlist (step ST5f). When the controller 101 reads out data, it saves a part of difference information as an independent file. When only a part of audio 1ch data is to be read out, the controller 101 saves only the audio data as one file, creates a new header, and creates a playlist while reading required positions.

Subsequently, upon completion of updating of the playlist for replacement file 1, the controller 101 sets "2" in the replacement number (step ST5g), and checks whether or not the replacement number exceeds a designated number "N" (step ST5h). After that, the controller 101 repetitively executes the processes in steps ST5e to ST5h until the replacement number reaches the designated number "N".

Figure 6:
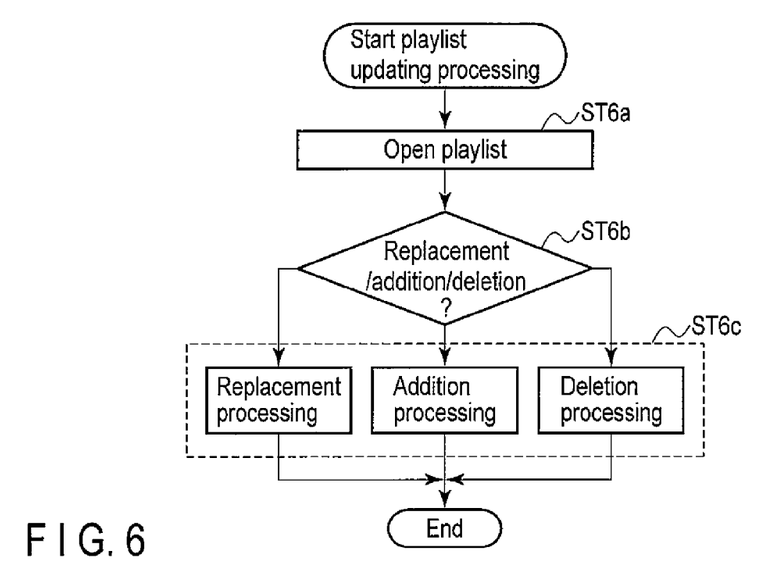
FIG. 6 is a flowchart showing the control processing sequence of the controller upon updating a playlist according to the embodiment.

FIG. 6 is a flowchart showing the control processing sequence of the controller 101 upon updating a playlist.

Even when there is no difference, the controller 101 creates a new playlist for each set of video, audio (for each CH), and ANC data at the time of recording of contents data (step ST6a), and writes, as initial information, source contents information as sub-clip information. For this reason, since the playlist is already available when a difference is created, the controller 101 reads out the playlist file from the memory 102 to determine replacement, addition, or deletion (step ST6b), and executes replacement, addition, or deletion processing (step ST6c). Difference information has the same playback time as that of the whole contents.

Figure 7:
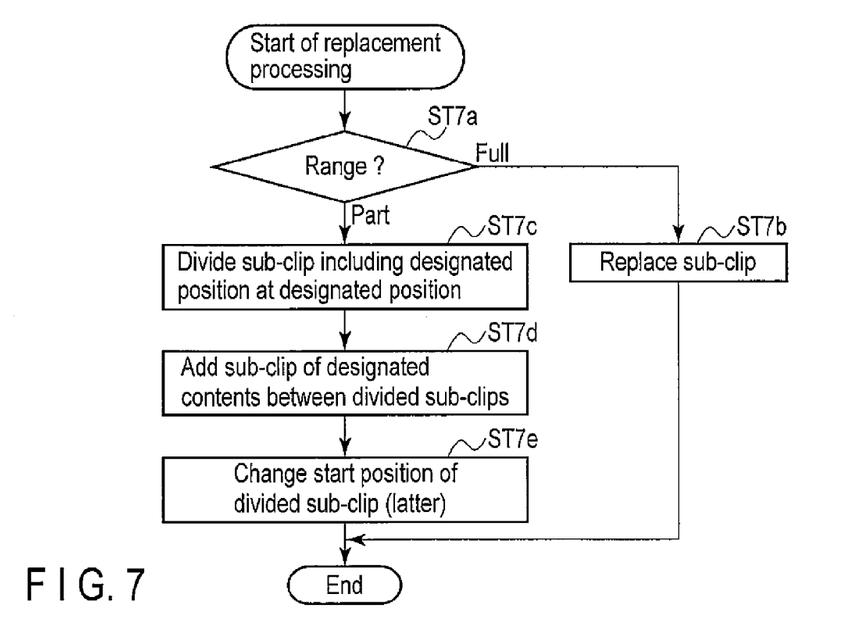
FIG. 7 is a flowchart showing replacement processing of the controller in the playlist updating (including creation) processing according to the embodiment.

FIG. 7 is a flowchart showing the replacement processing of the controller 101 in the playlist updating (including creation) processing.

If a replacement range corresponds to whole data, the process shifts the state from step ST7a to step ST7b, and the controller 101 deletes source sub-clip information in the playlist and replaces it by a designated contents.

On the other hand, if the replacement range is a part of data, the process shifts the state from step ST7a to step ST7c, and the controller 101 divides sub-clip information including a designated range, and adds sub-clip information of a designated contents between the pieces of divided sub-clip information (step ST7d).

Then, the controller 101 displaces the start position of the divided sub-clip information (latter) backward by the size of the added sub-clip information (step ST7e).

Figure 8:
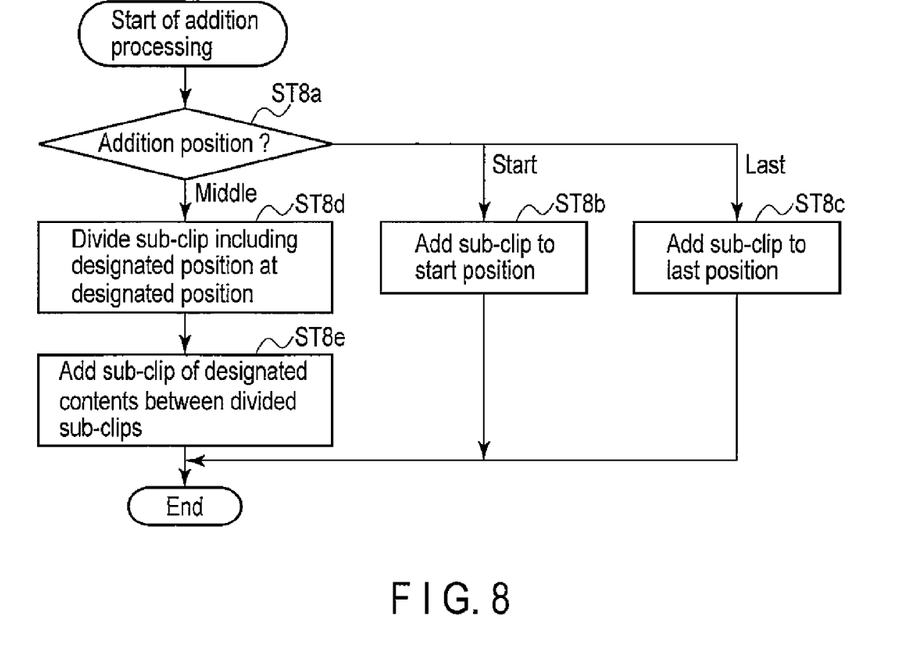
FIG. 8 is a flowchart showing addition processing of the controller in the playlist updating (including creation) processing according to the embodiment.

FIG. 8 is a flowchart showing the addition processing of the controller 101 in the playlist updating (including creation) processing.

If an addition position corresponds to a start position, the process shifts the state from step ST8a to step ST8b, and the controller 101 adds a designated range of a designated contents to the start position as sub-clip information. On the other hand, if the addition position corresponds to a last position, the process shifts the state from step ST8a to step ST8c, and the controller 101 adds the designated range to the last position as sub-clip information.

On the other hand, if the addition position corresponds to a middle position, the process shifts the state from step ST8a to step ST8d, and the controller 101 divides sub-clip information including a designated position at that designated position and adds sub-clip information of a designated contents between the pieces of divided sub-clip information (step ST8e).

Figure 9:
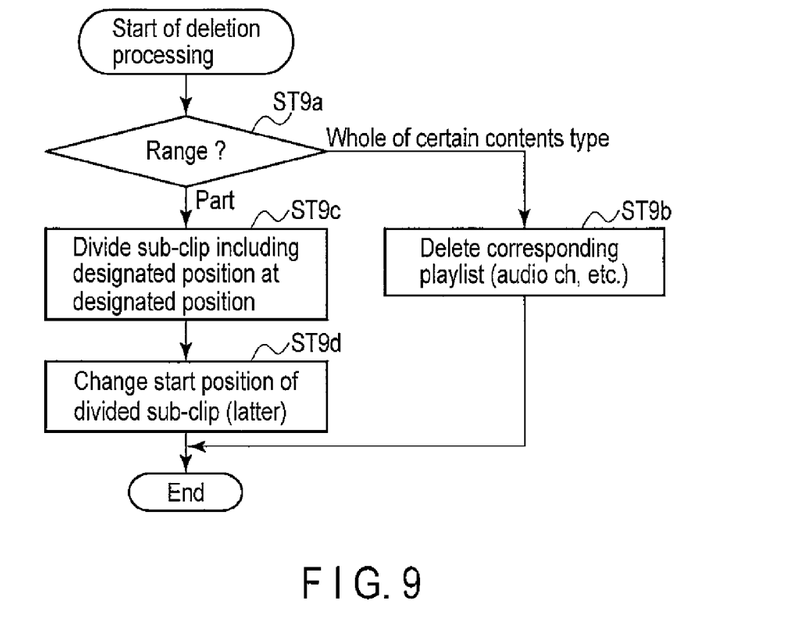
FIG. 9 is a flowchart showing deletion processing of the controller in the playlist updating (including creation) processing according to the embodiment.

FIG. 9 is a flowchart showing the deletion processing of the controller 101 in the playlist updating (including creation) processing.

If a deletion range corresponds to whole of a certain contents type, the process shifts the state from step ST9a to step ST9b, and the controller 101 deletes a playlist of the corresponding type. This is the case when the number of audio CHs is to be reduced.

On the other hand, if the deletion range corresponds to a part of data, the process shifts the state from step ST9a to step ST9c, and the controller 101 divides sub-clip information including a designated position at that designated position, and displaces the start position of the divided sub-clip information (latter) backward by the deleted size (step ST9d).

(Operation of Editing Apparatus 130 when Only Difference is Transmitted First During Editing Processing)

When only a difference is transmitted first during editing processing, an operator of the editing apparatus 130 issues a replacement request to the play-out server 100 while designating the following items. Then, the play-out server 100 can read out and save the difference as a replacement file of a folder of a replacement source contents as in the above sequence. The items to be designated include "ID of source contents", "ID of replacement contents (part)", "contents type", "change type", "transfer start position (replacement contents)", "transfer end position (replacement contents)", and "path of file of replacement contents".

The operator of the editing apparatus 130 makes a playlist save operation when an intermediate difference file is settled during the editing processing. Then, the editing apparatus 130 issues a difference file request to the play-out server 100 while designating "ID of source contents", "ID of replacement contents (part)", "contents type", "change type", "transfer start position (replacement contents)", "transfer end position (replacement contents)", and "path of file of replacement contents", and can start to save the difference file.

When the difference file is finally settled, the internal playlist of the play-out server 100 can be updated by designating the same information as that in the header expansion field in FIG. 3. In this case, whether or not the difference file has already been saved is checked to avoid the already copied difference data from being redundantly copied, thereby further shortening an updating time.

(Operation of Play-Out Server 100 when Re-Encode Processing is Executed Simultaneously with Playback Processing)

Figure 10:
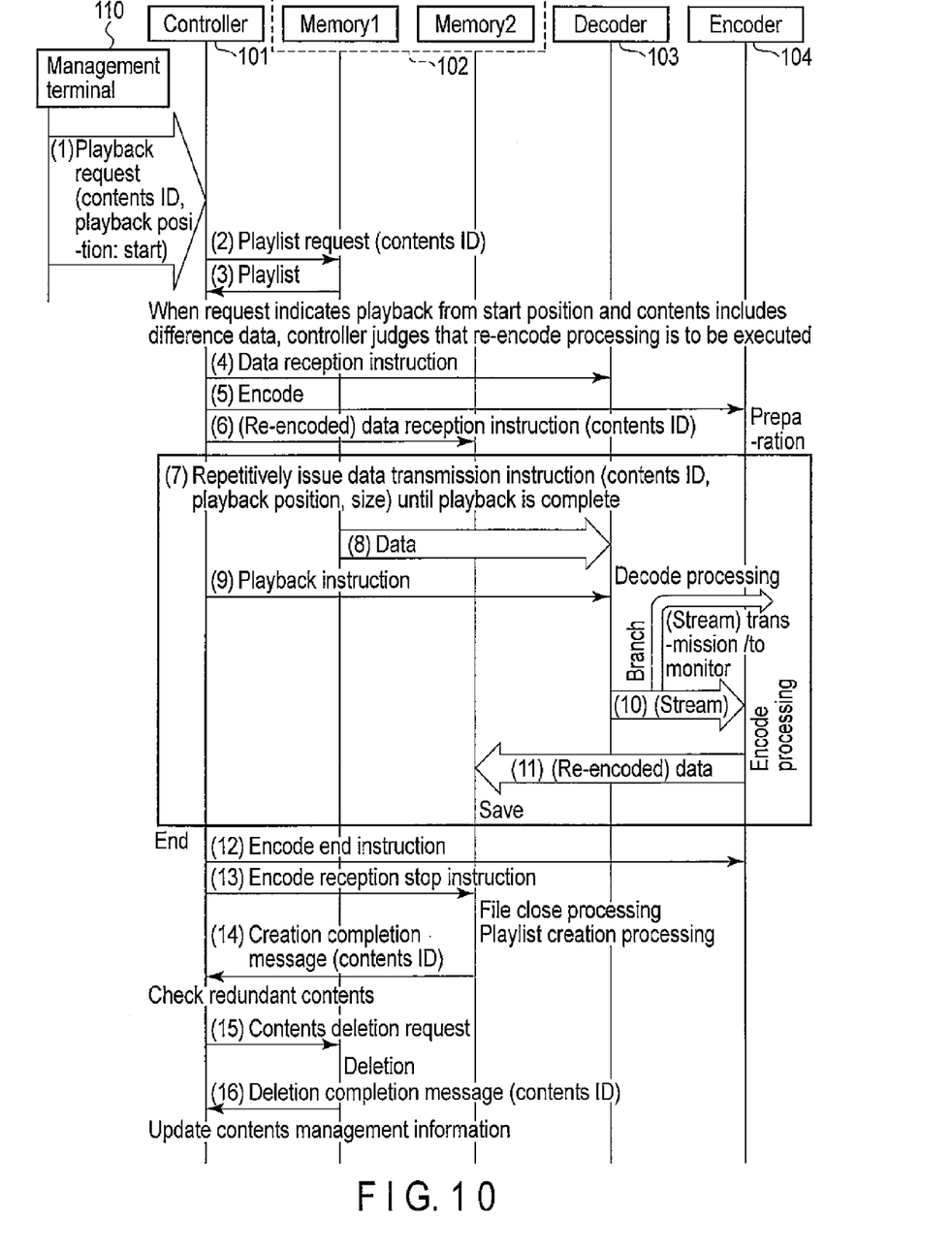
FIG. 10 is a sequence chart showing the operations of the play-out server upon re-encoding data simultaneously with playback processing.

FIG. 10 is a sequence chart showing the operations of the play-out server 100 when re-encode processing is executed simultaneously with playback processing.

Upon reception of a playback request from the management terminal 110 (FIG. 10(1)), the controller 101 searches the contents management information 101-2 for a memory which stores that contents, and determines the memory as memory set 1. The controller 101 requests memory 1 to send a playlist (FIG. 10(2)), and receives the playlist read out from memory set 1 (FIG. 10(3)).

The controller 101 issues a data reception instruction to the decoder 103 (FIG. 10(4)), and issues a playback preparation instruction to the encoder 104 (FIG. 10(5)). Since the request from the management terminal 110 indicates playback from the start position and the contents including difference data, the controller 101 judges that re-encode processing is to be executed, and searches the apparatus management information 101-1 and the current operating state for an empty memory set, and issues a data reception instruction after the re-encode processing to memory set 2 (FIG. 10(6)).

A portion bounded by a frame in FIG. 10 is playback processing. The controller 101 issues a data transmission instruction to the memory 102 for a given size (FIG. 10(7)), and data is transferred from the memory 102 to the decoder 103 (FIG. 10(8)). In this case, memory 1 creates data frame by frame and reads out the data in accordance with respective playlists corresponding to the contents ID.

The decoder 103 stores decoded data in a buffer, and the controller 101 controls the decoder 103 to play back the data by designating a playback position (FIG. 10(9)). Stream data is branched to be transmitted or to be output to a monitor according to its configuration, and is input to the encoder 104 (FIG. 10(10)). The stream data undergoes the re-encode processing, is then passed to empty memory set 2, and is saved as a new contents (FIG. 10(11)). The finished contents is transmitted to, for example, a server (not shown in FIG. 1) for an archive via the file output processor 105-2.

Upon completion of the playback processing, the controller 101 issues an encode end instruction to the encoder 104 (FIG. 10(12)), and issues a data reception stop instruction to memory set 2 (FIG. 10(13)). Memory set 2 executes post-processing such as file close processing and playlist creation processing, and sends a creation completion message, so that the controller updates the contents management information (FIG. 10(14)). Since the re-encoded contents is created, if a free memory space is to be assured, old contents data is deleted from memory set 1, thus increasing a free memory space (FIGS. 10(15) and (16)).

The processing in response to the playback request has been described. Since the controller 101 manages the operating state of the whole play-out server 100, when a replacement contents is ready to be played back, it can search for an idle decoder and encoder to automatically execute the re-encode processing.

(Generation Operation of Replacement File in Idle Time)

The controller 101 reads out a replacement file and source contents data to be replaced from the memory 102 based on an idle time, controls the decoder 103 to decode the replacement file and source contents data to be replaced, and controls the encoder 104 to re-encode them to generate one contents data. Then, the controller 101 records the generated contents data in the memory 102. In this case, the operator of the management terminal 110 sets, in advance, the controller 101 to automatically generate one contents data using the replacement file and source contents data when an idle time (for example, 13:00) is reached.

In this state, for example, when it is 13:00, the controller 101 reads out the replacement file and source contents data to be replaced from the memory 102, controls the decoder 103 to decode the replacement file and source contents data to be replaced, and controls the encoder 104 to re-encode them to generate one contents data. Then, the controller 101 records the generated contents data in the memory 102. In this manner, one contents data can be automatically generated using the replacement file and source contents data based on an idle time. Note that as the setting conditions, for example, processing loads of respective units, empty memory sets, and the like can be used in addition to the idle time.

As described above, in the above embodiment, the play-out server 100 generates a playlist which associates a contents ID required to specify contents data and the contents data, and stores and manages it in the memory 102 at the time of recording of the contents data. Upon reception of a change request for the contents data from the editing apparatus 130, the play-out server 100 acquires metadata in a header field of contents data to be changed from the editing apparatus 130, and checks with reference to the playlist in the memory 102 based on a contents ID included in the metadata whether or not the playlist can be updated and whether or not the contents data to be changed has already been recorded in the memory 102. When the contents data to be changed is recorded in the memory, the play-out server 100 applies change processing to the contents data in the memory 102 corresponding to the contents ID, and updates the contents data corresponding to the contents ID in the playlist after the contents data has undergone the change processing.

Therefore, using the playlist, which contents data in the memory 102 is to be changed can be specified based on the contents ID included in the metadata, thus avoiding already copied difference data from being redundantly copied, thus further shorting an updating time.

In the above embodiment, difference data is automatically specified using edit difference information indicating a contents ID, a position after replacement start position, and that before a replacement end position included in the metadata, thus acquiring the difference data from the editing apparatus 130 and playing it back.

Furthermore, in the above embodiment, using the decode processing at the time of playback, contents data to be changed is re-encoded by the encoder 104, and is recorded in the memory 102, thus playing back one contents data, only a change part of which has been changed.

Moreover, in the above embodiment, the re-encoded contents data is recorded in an empty memory set in the memory 102, thus assuring an area of the memory 102, and preventing system performance from lowering.

In addition, in the above embodiment, the operator of the editing apparatus 130 need only make the same operation as that upon transferring all contents data to the play-out server 100, thereby transmitting only difference data to the play-out server 100, and playing it back. In this way, an operation load on the operator can be greatly reduced.

Also, according to the above embodiment, since the contents data which have undergone the change processing are transmitted from the editing apparatus 130 to the play-out server 100 in turn, the play-out server 100 can play back even data including replacement data of a long time period within a short period of time.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A video server apparatus configured to record contents data of a group of pictures (GOP) in a memory and to play back the contents data in response to a playback instruction, comprising:

a table generator configured to generate a management table associating a first contents ID with the contents data, and to store the management table in the memory upon recording of the contents data, wherein the first contents ID corresponds to the contents data;

a receiver configured to receive contents management information upon generation of a change request for the contents data, wherein the contents management information comprises information indicating the first contents ID to be changed, a change start position, a transfer start position, a transfer end position, a change end position, and a second contents ID corresponding to changed contents data, wherein the transfer start position and the transfer end position designate a required part when data before and after replacement positions are required to generate contents data at the change start position and the change end position in terms of a compression format;

a decoder configured to decode contents data played back from the memory into a video signal;

an encoder configured to re-encode the video signal with the contents data; and a controller configured to look up the management table based on the first contents ID and the second contents ID in the contents management information, to read, from the memory, contents data to be edited corresponding to a period from the transfer start position and the transfer end position, to edit the contents data recorded in the memory based on a look-up result of the management table, to control the decoder to decode the contents data to be edited into the video signal, to control the encoder to re-encode the video signal with the edited contents data, to record the edited contents data in the memory, and to update the contents data corresponding to the first contents ID in the management table after the editing with the contents data corresponding to the second contents ID, wherein the editing comprises at least one of an addition of a part of the contents data, a deletion of a part of the contents data, and a replacement of a part of the contents data.

2. The apparatus of claim 1, wherein the controller designates a period after an addition start position and before an addition end position of a recording area of the memory, if the change request is an addition request of the contents data, and receives additional contents data corresponding to the period, and adds the additional contents data to the contents data corresponding to the first contents ID in the memory, wherein positions are included in the contents management information.

3. The apparatus of claim 1, wherein the controller designates a period after a deletion start position and before a deletion end position of a recording area of the memory, if the change request is a deletion request of the contents data, and deletes contents data corresponding to the period from the contents data corresponding to the first contents ID in the memory, wherein positions are included in the contents management information.

4. The apparatus of claim 1, wherein the controller designates a period after a replacement start position and before a replacement end position of a recording area of the memory, if the change request is a replacement request of the contents data, receives replacement contents data corresponding to the period from a request source, and replaces at least a part of the contents data corresponding to the first contents ID in the memory by the acquired replacement contents data, wherein positions are included in the contents management information.

5. The apparatus of claim 1, wherein the controller records the re-encoded contents data in an empty memory set in a plurality of memory sets, when the memory includes the plurality of memory sets.

6. The apparatus of claim 5, wherein the controller plays back the changed contents data from the memory according to a first condition, controls the decoder to decode the playback data, and controls the encoder to re-encode the decoded data.

7. The apparatus of claim 6, wherein the controller uses at least one of an idle time and an empty memory set in judging the first condition.

8. A video editing system comprising:

an editing apparatus configured to edit contents data of a group of pictures (GOP); and a video server apparatus operably connected to the editing apparatus and configured to record the contents data edited by the editing apparatus in a memory, and to play back the contents data recorded in the memory in response to a playback instruction, wherein the editing apparatus comprises:

a registration module configured to register changed contents data in a database, and to register contents management information in the database while appending the contents management information to the changed contents data, wherein the contents management information comprises information indicating a first contents ID to specify the contents data, a change start position, a transfer start position, a transfer end position, a change end position, and a second contents ID corresponding to changed contents data, wherein the transfer start position and the transfer end position designate a required part when data before and after replacement positions are required to generate contents data at the change start position and the change end position in terms of a compression format; and a change request receiver configured to receive a change request to the video server apparatus after registration in the database, and the video server apparatus comprising:

a table generator configured to generate a management table associating the first contents ID with the contents data, and to store the management table in the memory upon recording of the contents data;

a receiver configured to receive the contents management information of contents data to be changed from the editing apparatus if a change request of the contents data is received from the editing apparatus;

a decoder configured to decode contents data played back from the memory into a video signal;

an encoder configured to re-encode the video signal with the contents data; and a controller configured to look up the management table based on the first contents ID and the second contents ID in the contents management information, to read, from the memory, contents data to be edited corresponding to a period from the transfer start position and the transfer end position, to edit the contents data recorded in the memory based on a look-up result of the management table, to control the decoder to decode the contents data to be edited into the video signal, to control the encoder to re-encode the video signal with the edited contents data, to record the edited contents data in the memory, and to update the contents data corresponding to the first contents ID in the management table after the editing with the contents data corresponding to the second contents ID, wherein the editing comprises at least one of an addition of a part of the contents data, a deletion of a part of the contents data, and a replacement of a part of the contents data.

9. The system of claim 8 wherein the editing apparatus comprises a transmitter configured to transmit the edited contents data to the video server apparatus in order.

10. The system of claim 8, wherein the controller designates a period after an addition start position and before an addition end position of a recording area of the memory, if the change request is an additional request of the contents data, and acquires addition contents data corresponding to the period from a request source, and adds the received additional contents data to the contents data corresponding to the first contents ID in the memory, wherein positions are included in the contents management information.

11. The system of claim 8, wherein the controller designates a period after a deletion start position and before a deletion end position of a recording area of the memory, if the change request is a deletion request of the contents data, and deletes contents data corresponding to the period from the contents data corresponding to the first contents ID in the memory, wherein positions are included in the contents management information.

12. The system of claim 8, wherein the controller designates a period after a replacement start position and before a replacement end position of a recording area of the memory, if the change request is a replacement request of the contents data, receives replacement contents data corresponding to the period from a request source, and replaces at least a part of the contents data corresponding to the first contents ID in the memory by the replacement contents data, wherein positions are included in the contents management information.

13. The system of claim 8, wherein the controller records the re-encoded contents data in an empty memory set in a plurality of memory sets, if the memory includes the plurality of memory sets.

14. The system of claim 13, wherein the controller plays back the changed contents data from the memory according to a first condition, controls the decoder to decode the playback data, and controls the encoder to re-encode the decoded data.

15. The system of claim 14, wherein the controller uses at least one of an idle time and an empty memory set in judging of the first condition.

16. A control method of a video server apparatus for recording contents data of a group of pictures (GOP) in a memory and playing back the contents data recorded in the memory in response to a playback instruction, the apparatus including a decoder configured to decode contents data played back from the memory into a video signal and an encoder configured to re-encode the video signal with the contents data, comprising:

generating a management table associating a first contents ID with the contents data, and storing the management table in the memory upon recording of the contents data, wherein the first contents ID corresponds with the contents data;

receiving contents management information comprising information from a change request source upon generation of a change request for the contents data, wherein the contents management information comprises information indicating the first contents ID to be changed, a change start position, a transfer start position, a transfer end position, a change end position, and a second contents ID corresponding to changed contents data, wherein the transfer start position and the transfer end position designate a required part when data before and after replacement positions are required to generate contents data at the change start position and the change end position in terms of a compression format; and looking up the management table based on the first contents ID and the second contents ID included in the acquired contents management information, reading, from the memory, contents data to be edited corresponding to a period from the transfer start position and the transfer end position, to edit the contents data recorded in the memory based on a look-up result of the management table, controlling the decoder to decode the contents data to be edited into the video signal, controlling the encoder to re-encode the video signal with the edited contents data, recording the edited contents data in the memory, and updating the contents data corresponding to the first contents ID in the management table after the editing with the contents data corresponding to the second contents ID, wherein the editing comprises at least one of an addition of a part of the contents data, a deletion of a part of the contents data, and a replacement of a part of the contents data.

17. The method of claim 16, wherein the editing the contents data comprises designating a period after an addition start position and before an addition end position of a recording area of the memory, if the change request is an addition request of the contents data, and receiving additional contents data corresponding to the period from a request source, and adding the received additional contents data to the contents data corresponding to the first contents ID in the memory, wherein positions are included in the contents management information.

* * * * *